Figure 1:
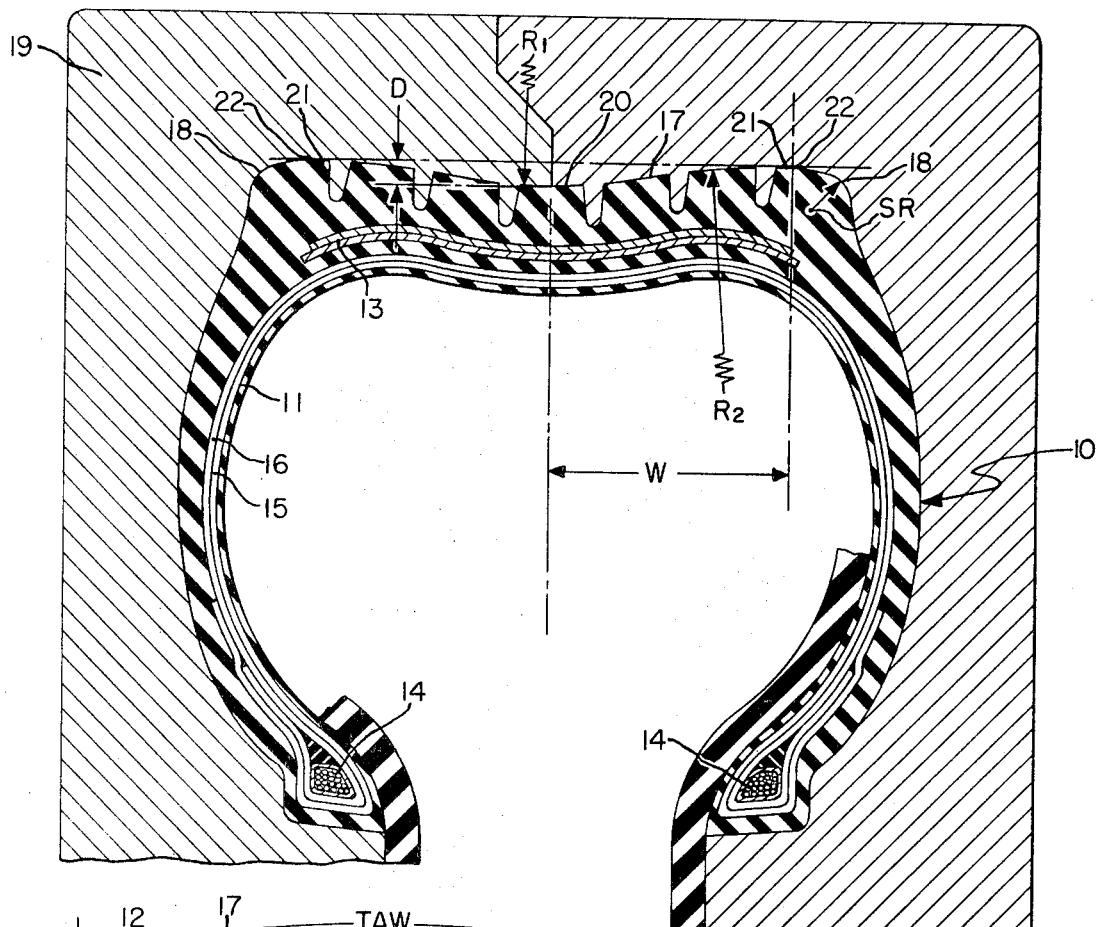

United States Patent

McKissick et al.

[11] 3,735,791
[45] May 29, 1973

[54] PNEUMATIC TIRE

[75] Inventors: Lance R. McKissick, Akron; Michael A. Kolowski, Tallmadge, both of Ohio

[73] Assignee: The Goodyear Tire & Rubber Company, Akron, Ohio

[22] Filed: June 7, 1971

[21] Appl. No.: 150,713

Related U.S. Application Data

[63] Continuation of Ser. No. 849,475, Aug. 12, 1969, abandoned.

[52] U.S. Cl. .................................................. 152/352
[51] Int. Cl. .................................................. B60c 3/00
[58] Field of Search .................................... 152/352

[56] References Cited

UNITED STATES PATENTS

| 3,517,720 | 6/1970 | Brown | 152/352 |
| 3,505,447 | 4/1970 | Billes | 264/326 X |
| 3,599,695 | 8/1971 | Knight | 152/352 |
| 3,542,107 | 11/1970 | Mills | 152/352 |
| 3,517,720 | 6/1970 | Brown | 152/352 |
| 3,237,672 | 3/1966 | McMannis | 152/352 |

Primary Examiner—Gerald M. Forlenza
Assistant Examiner—Robert Saifer
Attorney—F. W. Brunner

[57] ABSTRACT

A method of increasing the tread life of a radial belted pneumatic tire in which the tire is cured in a mold with the central portion of the tread in a reversely curved configuration. The depth of the reversely curved portion, during curing in the mold, is maintained within predetermined limits, and this reverse curvature in the tread is removable from the completely manufactured tire by inflation of the tire to design pressure.

The foregoing abstract is not to be taken as limiting the invention of this application, and in order to understand the full nature and extent of the technical disclosure of this application, reference must be made to the accompanying drawing and the following detailed description.

12 Claims, 2 Drawing Figures

INVENTOR.
LANCE R. McKISSICK
MICHAEL A. KOLOWSKI

BY Michael L. Gill
ATTORNEY

PNEUMATIC TIRE

CROSS REFERENCE TO RELATED APPLICATIONS

This application is a continuation of application Ser. No. 849,475 filed Aug. 12, 1969, now abandoned.

This invention relates to pneumatic tires, and in particular to a method of manufacturing radial belted pneumatic tires.

It is an object of this invention to provide a radial belted tire with substantially increased tread life without attendant disadvantages. Other objects and advantages of this invention will be apparent from the drawing and the following discussion thereof.

Figure 2:
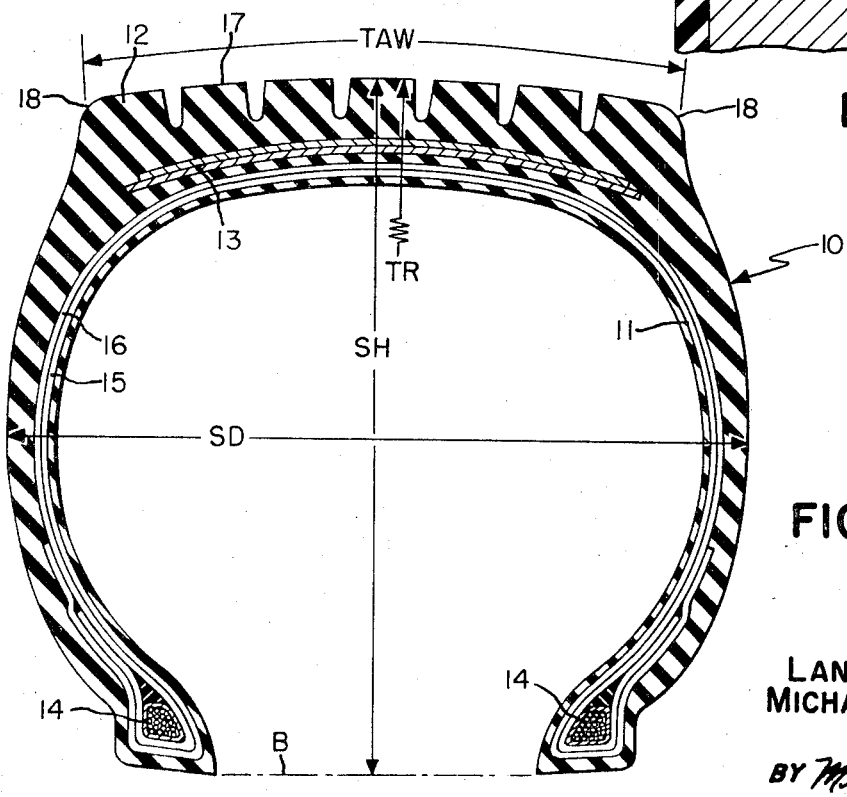

In the drawing:

FIG. 1 is a cross-sectional view of a tire in a mold in accordance with the method of this invention; and FIG. 2 is a cross-sectional view of an inflated tire made in accordance with this invention.

With reference to the drawing, and in particular FIG. 2, a tire 10 in accordance with this invention comprises a radial ply carcass 11 and a tread portion 12 disposed circumferentially about and radially outwardly of the carcass 11. A pair of belt plies 13 are disposed circumferentially about the carcass 11 and beneath the tread 12. The carcass 11 terminates at its radially inner ends in a pair of bead members 14. The carcass 11 and belt plies 13 are each comprised of a plurality of substantially parallel tire cords.

Although the carcass 11 as illustrated has two radial plies 15 and 16, it is to be understood that one or more radial plies may be utilized. For purposes of this invention, a radial ply shall include a ply whose cords extend at an angle of between 75° and 90° with respect to the mid-circumferential centerline of the tread 12 at said centerline and are of any suitable material, such as by way of example only, nylon, rayon, polyester or wire. Also, for purposes of this invention, "mid-circumferential centerline" shall be a circle which lies on the tread surface midway between the lateral edges thereof and is contained in a plane perpendicular to the rotational axis of the tire. This plane containing the mid-circumferential centerline shall be referred to hereinafter as the "mid-circumferential centerplane."

Although in the specific embodiment illustrated there are two belt plies 13, it is to be understood that one or more belt plies may be utilized. The cords in each belt ply extend at an angle of between 10 and 45 degrees with respect to the mid-circumferential centerline of the tread at said centerline and are of any suitable material such as, by way of example only, polyester, rayon, fiberglass or wire.

As illustrated in FIG. 2, the tire 10 has, when mounted on a rim, and inflated, a bead baseline B which extends parallel to the rotational axis of the tire and is spaced radially therefrom a distance equal to the nominal radius of the rim on which the particular tire is mounted. For purposes of this invention, all cross-sectional dimensions of the tire will be made with reference to the cross-section of the tire as it appears in a plane within which lies the rotational axis of the tire. The cross-sectional width, SD, of the tire is measured parallel to the rotational axis of the tire when the tire is mounted on a 70 percent rim, inflated to design pressure and unloaded. As indicated at SD, the section width is equal to the distance between the outside surfaces of the tire at its widest point exclusive of any adornment, design, lettering, or the like. For purposes of this invention, "design pressure" shall mean the internal pressure which the tire is designed to be inflated to under normal operating conditions. Also, for purposes of this invention, and as is well known to skilled tire designers, a "70 percent rim" shall mean a rim having a lateral distance between the inside sides of the rim flanges as measured in a direction parallel to the rotational axis of the tire which is equal to 70 percent of the section width SD when the tire is mounted on the rim and inflated to design inflation pressure. The section height SH of the tire is indicated at SH and again is measured when the tire is mounted on a 70 percent rim, inflated to design pressure and unloaded. The section height SH is the distance measured radially of the tire from the bead baseline B to the radially outermost point on the tread 12 at the mid-circumferential centerline of the tread. The tread radius indicated at TR is the radius of an arc which coincides with the outer surface 17 of the tread 12 in at least the area of the mid-circumferential centerline. A positive tread radius is one in which the center of curvature of the arc is located radially inwardly of the tread with respect to the rotational axis of the tire. A negative tread radius is one in which the center of curvature of the arc is located radially outwardly of the tread with respect to the rotational axis of the tire. Also, for purposes of this invention, the tread arc width TAW is the distance between the lateral edges 18 of the tread and in a plane containing the rotational axis of the tire. The "lateral edge" of the tread 18 is the laterally outermost point of the tread which touches the tread supporting surface when the tire is mounted on a 70 percent rim, inflated to design pressure and statically loaded to design load. The "design load," for purposes of this invention, shall be the load under which the tire is designed to be normally operated.

In the normal manufacture of a radial belted tire, the carcass plies and beads are assembled on a generally cylindrical tire building drum. The carcass is shaped to toroidal form, and the belt plies and tread are applied. The tire is subsequently cured under heat and pressure in a mold to form the finished product.

With reference to FIG. 1, and in accordance with the present invention, a tire 10 is cured with its tread 12 maintained in a reversely curved configuration. This reverse curvature is such that the radial distance from the rotational axis of the tire to the tread surface 17 at the mid-circumferential centerline is less than the radial distance from the rotational axis of the tire to the tread surface 17 at either of a pair of portions 21 disposed laterally of and on opposite sides of the mid-circumferential centerline. In other words, the central portion 20 of the tread is, during the molding and curing of the tire, depressed below the portions 21 of the tread on laterally opposite sides of the central portion 20. This depression forms a smooth reversely curved portion 20 in the central area of the tread 12 during the curing thereof in the mold 19.

The depth D of the depression is measured while the tire is in the mold 19 and at the mid-circumferential centerline where it is the largest and is the distance from the surface 17 of the tread 12 at the mid-circumferential centerline to a line which is parallel to the rotational axis of the tire and tangent to the portions 21 measured radially of the rotational axis of the tire. The point at which each portion 21 is tangent to the line parallel to the rotational axis of the tire is spaced from said mid-circumferential centerline a distance equal to at least one-third of the distance from the mid-circumferential centerplane to the lateral edge 18.

The magnitude of the depth $D$ is of particular importance, and in order to obtain satisfactory results should be kept within certain limits. The minimum depth $D$ or $D_{min}$ should be at least 0.005 inch. The maximum depth $D$ or $D_{max}$ should be no greater than a distance defined by the equation $$D_{max} = 4{,}000\ TAW/[T(\cos\alpha_{eff})^3 AR] + (\alpha_{eff}/1{,}000)+(1/M)$$

In the above equation the term TAW is the tread arc width in inches as defined previously. $T$ is the ultimate belt strength in pounds in a direction circumferentially of the tire per inch of width of belt. The magnitude of $T$ is determined by multiplying the breaking strength in pounds of one cord in the belt by the total number of ends of cords per inch in the belt. The breaking strength of the cord is determined just prior to calendering of the fabric. The total number of ends of cords per inch in the belt is the total number of ends of cords in all the belt plies in a one inch wide cross-section of the belt located centrally of the mid-circumferential centerline. As mentioned previously, all cross-sectional dimensions are taken with reference to the cross-section of the tire as it appears in a plane within which lies the rotational axis of the tire. AR is the aspect ratio of the tire when mounted on a 70 percent rim inflated to normal inflation pressure and unloaded. The aspect ratio is the number obtained by dividing the section height $SH$ by the section width $SD$, or expressed mathematically $Ar = SH/SD$. Again as discussed above, the section width and section height are determined when the tire is mounted on a 70 percent rim, inflated to design inflation pressure and unloaded. $M$ is the modulus of elasticity of the cords in the belt in grams per denier. The modulus of elasticity of a cord is the slope of the initial straight portion of the stress-strain curve for the cord with the cord in the condition it normally is just prior to calendering of the cord fabric. The constant, 4,000, in the numerator of the first term is in pounds per inch. The constant 1,000, in the denominator in the second term is in degrees per inch. The constant, 1, in the numerator of the third term is in inch-grams per denier. $\alpha_{eff}$ is the angle of the cords in the belt plies and is equal to the angle in degrees that the cords in the belt plies form with the mid-circumferential centerline at said centerline when the tire is cured and inflated to design inflation pressure on a 70 percent rim and unloaded. If the cord angle varies in the different belt plies, the effective cord angle $\alpha_{eff}$ must be determined by the equation $$\alpha\ eff = [N\alpha_1 + (N-1)\alpha_2 + (N-2)(\alpha_3) + \ldots \alpha_N]/[N + (N-1) + (N-2) + \ldots 1]$$

In the above equation $N$ is the total number of belt plies in the belt. $\alpha_1$ is the cord angle of the belt ply having the lowest cord angle. $\alpha_2$ is the cord angle of the belt ply having the next to th lowest cord angle. $\alpha_3$ is the cord angle of the belt ply having the third lowest cord angle. $\alpha_N$ is the cord angle of the belt ply having the highest cord angle.

If the depression $D$ is kept within the limits of $D_{min}$ and $D_{max}$ as defined above during the curing of the tire in the mold the normal or design inflation pressure in the tire when mounted on a rim will provide sufficient internal force to remove the depression D and expand the tread radially outwardly of the rotational axis of the tire to form an arc at the mid-circumferential centerline with its center of curvature radially inwardly of the tread surface with respect to the rotational axis of the tire. This will result in a tire having improved tread life and traction. Optimum results, however, are obtained when the depth $D$ of the depression is maintained at approximately $\frac{1}{3}(D_{max} + D_{min})$ during the curing of the tire in the mold.

In the embodiment illustrated the cross-sectional contour of the depression D in the central portion 20 of the tread 12 while the tire is in the mold is defined by an arc of a circle having its center lying in the mid-circumferential center plane radially outwardly of the tread with respect to the rotational axis of the tire and lying in a plane containing said rotational axis. The cross-sectional contour of each portion 21 disposed laterally of the central portion is defined by an arc of a circle having its center lying in a plane containing the rotational axis of the tire and radially inwardly of the tread with respect to the rotational axis of the tire. The distance $W$ which the center of curvature of each portion 21 is spaced from the mid-circumferential center plane is defined by the equation $$W = \tfrac{1}{2}(TAW - SR - D)$$

where TAW and $D$ are the tread arc width and depression respectively as defined above.

$SR$ is the mold tread shoulder radius which is a matter of design choice to be determined by the tire engineer.

The radius of the curvature of the arc in the central portion 20 is defined by the equation $R_1 = (D^2 + W^2/3D)$. The radius of curvature of each portion 21 is equal to one-half of the radius $R_1$ of the central portion, or $R_2 = R_1/2$. This curvature of the central portion 20 and portions 21 on opposite sides of the central portion 21 while preferred is not critical, and the desired results will be produced with any smooth reverse curve in the central portion of the tread which terminates in side portions of the tread each having radially outermost points 22 tangent to a common tangent parallel to the rotational axis of the tire at a point spaced from the mid-circumferential centerline of the tread a distance of at least one-third of the distance from said mid-circumferential centerline to the lateral edge. It is important, however, that the depth $D$ of the depression in the central area of the tread be maintained within the prescribed limits. In the design of a radial ply tire the desired aspect ratio $Ar$, the tread arc width TAW, and the shoulder radius $SR$ are a matter of choice and are determined by the tire engineer. The determination of the materials, construction and general mold shape necessary to render a tire having the desired geometric characteristics is within the skill of the art. Once having determined these variables the dip in the tread portion of the mold, the radius of curvature of the central portion in the mold and the radius of curvature of the raised portions in the mold are determined by the above described method.

In a specific example, size FR70–14 radial ply tires were built to the same specifications. The pertinent specifications for the completely manufactured tire were:

Belt = four plies of 1650/3 rayon having 20 ends per inch

Breaking Strength = 46.5 pounds per cord of rayon cord $T$ = four plies (20 ends per inch) (46.5 pounds per cord) = 3720 pounds per inch $\alpha = 12°$ TAW = 6 inches

AR = 70

M = 130 grams per denier

The calculation of maximum depth $D_{max}$ of the depression therefore was $$D_{max} = 4{,}000\ TAW/[T(\cos\alpha)^3 AR] + (\alpha/1{,}000) + (1/M)\ \text{or}$$

$$D_{max} = [4{,}000\ (6)]/[3{,}720(\cos 12°)^3(70)] + (12/1{,}000) + (1/130) = 0.118\ \text{inch}$$

For optimum results therefore D was $D = \frac{1}{3}(0.005 + 0.118)$ or $D = 0.041$ inch.

Half of the tires were cured with their tread having a positive radius of curvature in the mold. The rest of the tires were cured with a smooth depression across the tread area the maximum depth of which was 0.041 inch at the mid-circumferential certerline. The radius of curvature of the central portion 20 was equal to $R_1$ as defined above. The radius of curvature of each side portion or lateral portion 21 was equal to $R_2$ as defined above. Each tire was mounted on a 70 percent rim, inflated to design pressure and road tested for tread life. The average tread life of the tires that were cured in molds with their treads maintained with a positive radius of curvature was 30,000 miles. The average tread life of the tires cured according to the method of this invention, that is, those cured with the depression of 0.041 inch in the mid-circumferential centerline was 40,000 miles.

While certain representative embodiments and details have been shown for the purpose of illustrating the invention, it will be apparent to those skilled in the art that various changes and modifications may be made therein without departing from the invention.

What is claimed is:

1. A pneumatic tire of the type having a radial ply carcass, a tread portion and a cord reinforced belt, the improvement comprising: when said tire is in the configuration in which it was cured said tread, as viewed in planes containing the rotational axis of the tire, has a depression in the central portion thereof, said depression being defined by a smooth curve having a maximum depth which is between 0.005 inch and 4,000 TAW/[$T(\cos \alpha_{eff})3AR$] + ($\alpha_{eff}/1{,}000$) + (1/M) inch where TAW equals the tread arc width, $T$ equals the belt strength, $\alpha$ equals the effective cord angle of the belts, AR equals the aspect ratio, and M equals the modulus of elasticity of the cords in the belts; and, when said tire is inflated to design inflation pressure and unloaded, said tread has a positive radius of curvature at the mid-circumferential centerline.

2. A tire as claimed in claim 1, wherein said tire when in the configuration in which it was cured said tread has a pair of raised portions disposed one each on laterally opposite sides of said depression, the point at which each said raised portion is tangent to a common straight tangent parallel to the rotational axis of the tire being spaced from the mid-circumferential centerplane of the tread a distance equal to at least one-third of the distance from said mid-circumferential centerplane of the tread to the lateral edge of the tread.

3. A tire as claimed in claim 2, wherein the distance from the mid-circumferential centerplane of the tire to said tangent point of each raised portion is defined by the equation ½ (TAW $-SR -D$) where W equals said distance, TAW equals the tread arc width, D equals the depression, and SR equals the shoulder radius of the mold.

4. A tire as claimed in claim 3, wherein the radius of curvature of said depression is defined by the equation $R_1 = (D^2 + W^2)/3D$ wherein $R_1$ equals said radius of curvature of said depression, and D equals the depth of said depression at said mid-circumferential centerplane, and the radius of curvature of each said raised portion is equal to one-half of the radius of curvature of said depression.

5. A tire as claimed in claim 1, wherein said depression is equal approximately to $$\frac{1}{3}\left[\frac{4000\ TAW}{T(\cos \alpha_{eff})3AR} + \frac{\alpha_{eff}}{1000} + \frac{1}{M} + 0.005\right]\ \text{inch}.$$

6. A tire as claimed in claim 4, wherein said depression is equal approximately to $$\frac{1}{3}\left[\frac{4000\ TAW}{T(\cos \alpha_{eff})3AR} + \frac{\alpha_{eff}}{1000} + \frac{1}{M} + 0.005\right]\ \text{inch}.$$

7. In a method of making a pneumatic tire of the type having a radial ply carcass, a tread portion having a positive radius of curvature at the mid-circumferential centerline when the tire is inflated to design inflation pressure and unloaded and a cord reinforced belt: the improvement comprising; placing the tire in a mold; forming the tire in a toroidal configuration; forming a circumferentially extending smooth depression in the surface of the tread in the area of the mid-circumferential centerline; forming a pair of circumferentially extending raised portions in the surface of the tread one each on laterally opposite sides of said depression, said depression being defined by a smooth curve having a maximum depth which is between 0.005 inch and 4,000 TAW/[$T(\cos \alpha_{eff})3AR$] +($\alpha$ eff/1,000) +(1/M) inch where TAW equals the tread arc width, $T$ equals the belt strength, $\alpha$ equals the effective cord angle of the belts, AR equals the aspect ratio, and M equals the modulus of elasticity of the cords in the belts; and curing said tire while maintaining the aforedescribed configuration.

8. A method as claimed in claim 7, wherein each said raised portion is tangent to a common straight tangent parallel to the rotational axis of the tire at a point spaced from the mid-circumferential centerplane of the tread a distance equal to at least one-third of the distance from said mid-circumferential centerplane of the tread to the lateral edge of the tread.

9. A method as claimed in claim 8, wherein the distance from the mid-circumferential centerplane of the tire to said tangent point of each said raised portion is defined by the equation ½ (TAW $-SR -D$) where W equals said distance, TAW equals the tread arc width, D equals the depression, and SR equals the shoulder radius of the mold.

10. A method as claimed in claim 9, wherein the radius of curvature of said depression is defined by the equation $R_1 = (D^2 + W^2/3D)$ wherein $R_1$ equals said radius of curvature of said depression, and $D$ equals the depth of said depression at said mid-circumferential centerplane, and the radius of curvature of each said raised portion is equal to one-half of the radius of curvature of said depression.

11. A method as claimed in claim 7, wherein said depression is equal approximately to $$\frac{1}{3}\left[\frac{4000 TAW}{T(\cos \alpha_{eff})3AR}+\frac{\alpha_{eff}}{1000}+\frac{1}{M}+0.005\right] \text{ inch}.$$

12. A method as claimed in claim 10, wherein said depression is equal approximately to $$1\left[\frac{4000 TAW}{T(\cos \alpha_{eff})3AR}+\frac{\alpha_{eff}}{1000}+\frac{1}{M}+0.005\right] \text{ inch}.$$

* * * * *